March 11, 1969  E. C. JACOBSON  3,431,983
POSITIONABLE CONTROL ASSEMBLY
Filed Nov. 14, 1966  Sheet 1 of 2
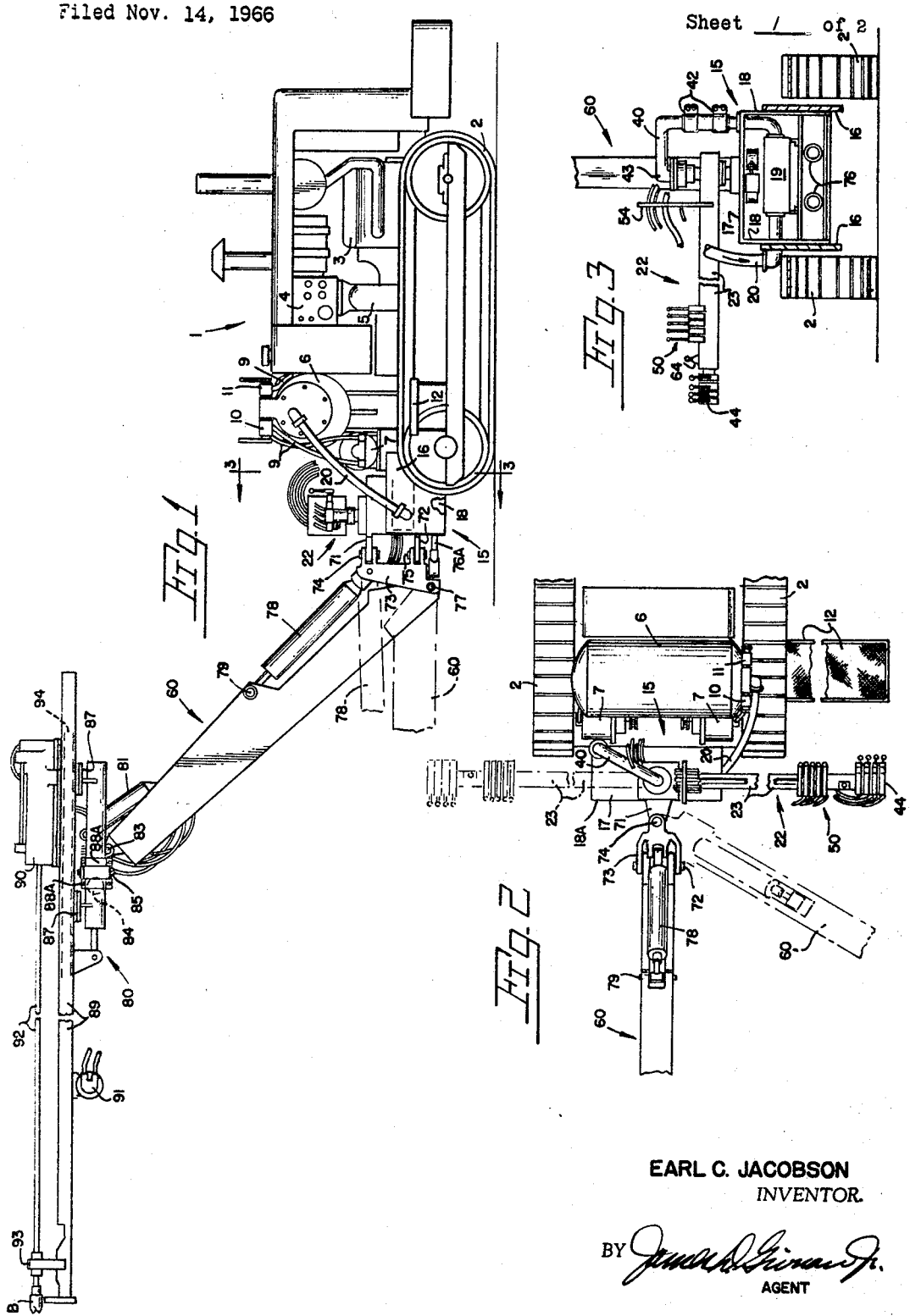
EARL C. JACOBSON
INVENTOR.
BY
AGENT

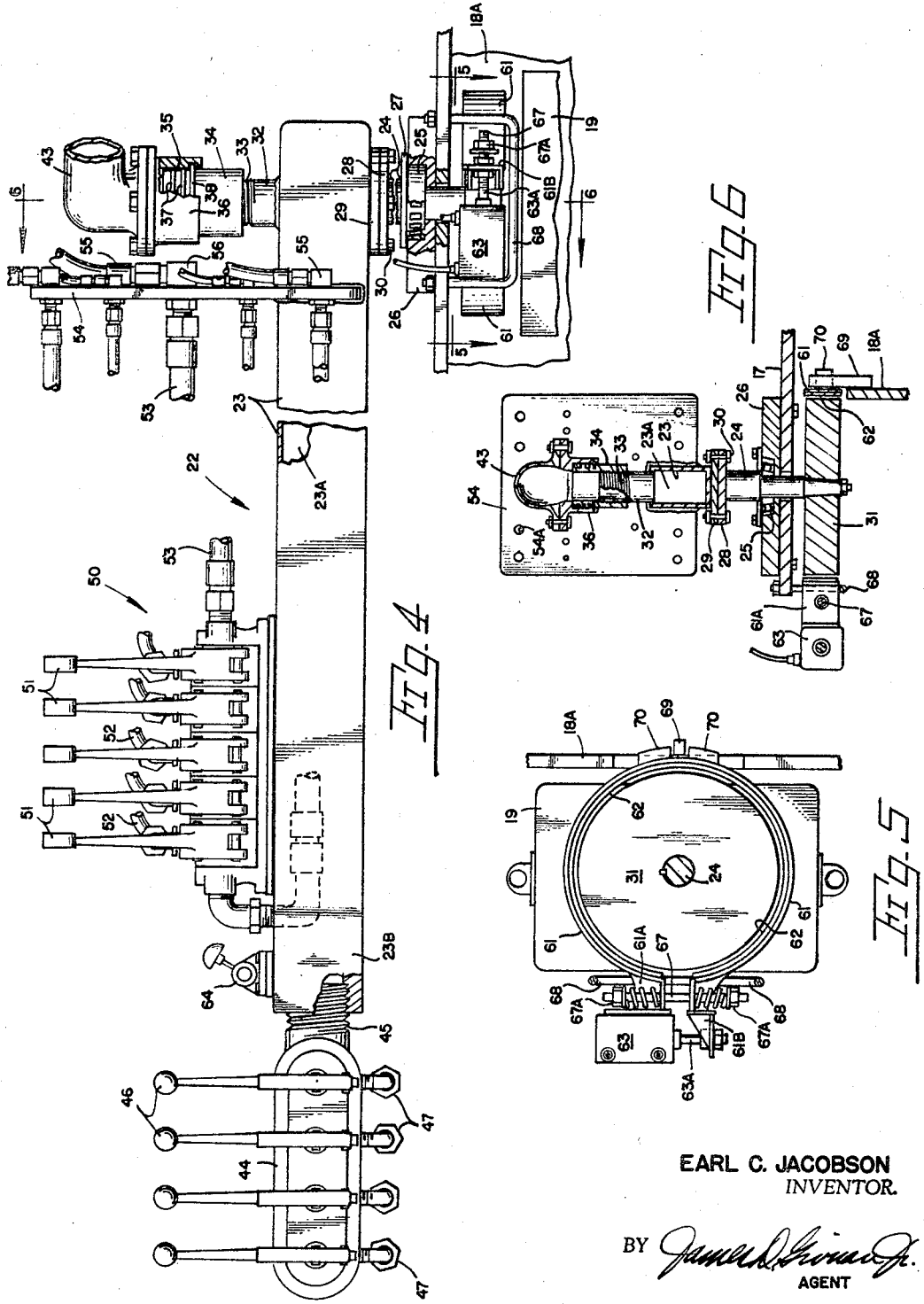

United States Patent Office 3,431,983
Patented Mar. 11, 1969

3,431,983
POSITIONABLE CONTROL ASSEMBLY
Earl C. Jacobson, 377 Santa Clara Ave.,
Eugene, Oreg. 97402
Filed Nov. 14, 1966, Ser. No. 593,970
U.S. Cl. 173—43        6 Claims
Int. Cl. E21c 5/11, 9/00, 11/02

ABSTRACT OF THE DISCLOSURE

A track supported crawler type tractor is disclosed having a working boom member swingably mounted to one end of the tractor with drilling equipment being pivotally carried at the boom member's outer end. Separately and swingably mounted to the tractor chassis is a control arm having operator manipulated valve assemblies at its outer end with said valve assemblies being in circuit with the drilling equipment to enable a machine operator to control said drilling equipment from a location removed from the tractor and preferably oppositely of the tractor's centerline from the operating drilling equipment to avoid falling debris.

---

This invention relates generally to machinery of the type including a movable base having a positionable boom and more particularly to novel control permitting operation of the boom and components carried thereon from a location remote from the mobile base.

The present invention has as one of its important objects the provision of an elongate arm, pivotally attached to the mobile base and extending outwardly therefrom to permit a machine operator to be stationed at a point removed from a hazardous work area. For example, in the operation of machinery having a vertically and horizontally positionable boom such as of the type associated with back hoe machines, the close proximity of the working instrument to the vehicle often results in the operator, seated on the machine, being subject to injury from falling debris. In machinery wherein the boom serves to position the working instrument to an elevated position as of the type shown, the danger is even more pronounced. In view of the foregoing I have provided a positionable control arm which is independent from and unrestricted throughout its travel by the boom member. Accordingly, the machine operator may position the control arm to either side of the mobile base to station himself at a point furthest removed from the working instrument.

A further important object resides in the novel construction of the control arm wherein the arm itself, in addition to serving as a support for valve control assemblies serves as a high capacity pressure conduit in circuit with the arm mounted valve assemblies. This advantage of the present invention is particularly desirable when a substantial number of valve controls are required for machinery operation and makes possible the supplying of adequate pressure to each control with a minimum of exposed conduits.

A further important object of this invention resides in the provision of locking means for the pivotally mounted control arm to permit the operator to swingably position and lock the elongate control arm in any desired location to prevent movement of the arm during operation of the machinery. Further, adjustable means are associated with the arm to permit setting of a desired drag action against the swinging movement of the arm.

The foregoing and other objects and advantages which will become subsequently apparent reside in the details of construction and operation as more fully hereinafter described and claimed, reference being had to the accompanying drawings forming a part hereof and in which:

FIGURE 1 is a side elevation of a machine including a mobile base and a positionable boom with the boom thereof disposed medially of a projected machine centerline and the control arm of the present invention extending laterally therefrom;

FIGURE 2 is a fragentary, plan view of FIGURE 1 showing the rearward portion of the base unit, the control arm and a fragment of the boom;

FIGURE 3 is a sectional, elevational view taken along line 3—3 of FIGURE 1;

FIGURE 4 is a detail view of the control arm as seen in FIGURE 3 including pivotal mounting means and a locking mechanism therefor;

FIGURE 5 is a horizontal, sectional view taken along line 5—5 of FIGURE 4 showing the brake mechanism; and FIGURE 6 is a sectional view taken along line 6—6 of FIGURE 4 showing an air coupling arrangement in communication with the interior of the arm.

With continuing reference to the drawings wherein like numerals identify like parts and particularly FIGURE 1 thereof, the reference numeral 1 indicates generally a mobile base unit having a chassis supported by a pair of ground engaging endless tracks 2. Carried by the mobile base unit is an engine or prime mover 3, having conventional engine controls mounted upon a control panel 4, and which is in driving engagement with air compressor means 5. An air pressure tank is indicated at 6 and is charged through conduit means (not shown) interconnecting the tank and the compressor.

A pair of chassis mounted air motors are indicated at 7 transversely spaced from each other and each in driving engagement with one of the pair of endless tracks 2 through suitable power transmission means such as, for instance, a chain drive. Providing a controlled flow of pressurized air to each motor 7 are pairs of air conduits as at 9, said conduits being in communication with the tank 6 through two manually operated valves 10 and 11. The valves 10 and 11 may be uniformly moved for synchronized driving of the air motors and hence the base unit 1 in a forward or reverse direction or independently positioned for driving the air motors and tracks at different speeds to effect a turn. An operator platform is provided at 12. While the foregoing description is of an air driven base unit it will be appreciated that a base unit having a conventional drive train could be utilized without limiting the spirit and scope of this invention. A copending application entitled Tractor Mounted Drilling Apparatus, Ser. No. 447,216, and filed Apr. 12, 1965, now abandoned, is based upon the general machinery arrangement shown.

A housing indicated generally at 15 is affixed to the rearward end of the mobile base chassis by vertical side plates 16, the housing comprising a cover plate 17, sidewalls 18 and an end wall 18A. Within the housing 15 is secured an air oiler tank 19 which receives a pressurized flow of air from the tank 6 by a main air conduit 20. The outlet side of the air oiler tank 19 is in open communication with the interior of the control arm as hereinafter described.

Swingably mounted upon the cover plate 17 in an elevated manner is the positionable control arm indicated generally at 22 as best viewed in FIGURE 4 of the drawings which comprises an elongate support 23, rectangular in section to provide an air chamber therewithin at 23A. The inner or attached end of the support 23 is carried by pivot means including downward extending shaft 24, said shaft being journalled within a suitable thrust bearing 25. The bearing 25 is retained within a recessed block 26, the latter welded to cover plate 17 of the housing. A retainer ring 27 is removably secured to the block 26 for periodic servicing of the bearing 25. The lower end of shaft 24 terminates downwardly in keyed engagement with a circular brake plate 31 as later described, while the upper end thereof is secured to one of a pair of corresponding plate members 28–29 in bolted engagement at 30. The upper plate member 29 as viewed in FIGURE 6 is of greater width than the arm 22 and welded thereto to provide a stable support means therefor.

The length of arm 22 may vary to best suit the type and size of mobile base unit on which it is mounted. As in the case where the boom-carried implement as shown in FIGURE 1 is a drilling apparatus, it is desirable in the interest of safety to provide a control arm of a length to permit the operator to station himself several feet from one side of the base unit or projected centerline thereof.

In axial alignment with the shaft 24 but extending oppositely or upwardly from arm 22 is a pipe stub 32 constituting part of an air coupling in threaded but locked securement at its upper end at 33 with a second pipe member 34, the latter being confined for rotational movement within an annular bearing surface 35 provided interiorly of an inverted cup-shape fitting 36. Indicated at 37 are suitable airtight seals such as O-rings while at 38 a locking ring is shown which is received in a corresponding annular recess in the bearing surface 35 of the second pipe member 34. Obviously other suitable pivotal coupling arrangements may be utilized.

A second main conduit 40 serves to convey air under pressure from the air oiler tank 19 within housing 15 through the above described coupling arrangement to the air chamber 23A within the control arm 22. As shown in FIGURE 3, the conduit 40 may include a vibration dampening sleeve 41 secured with conventional heavy duty clamping rings 42 of the type including locking elements engageable with the metal segments of the conduit to prevent separation thereof upon pressurization. The upper end of the conduit 40 terminates in a flanged elbow 43 in bolted engagement with cup shaped fitting 36.

With continuing reference to the control arm 22 the outer end thereof is enlarged at 23B to receive the inlet end of a pneumatic valve housing 44 of which a threaded extension 45 serves both as an inlet and mounting means therefor. The valve housing shown includes four spools each having a separate lever control at 46 for manually directing air under pressure to boom-mounted components through fittings 47 and air conduits attached thereto.

Arm 22 further provides support means for additional controls necessary for the operation of the hydraulic equipment shown, said controls comprising a hydraulic valve manifold indicated generally at 50 comprising a plurality of valves having separate lever controls 51 conveniently located for operational control of the hydraulic components by the operator. It will be understood that each valve control 51 may be operated to direct fluid pressure through the hydraulic lines shown as at 52. A high capacity supply line at 53 interconnects the valve manifold 50 with a conventional hydraulic pump (not shown) driven by the prime mover 3. It is believed obvious that variations in the number and type of valve controls mounted upon the control arm may be necessary as dictated by the components without departing from the spirit and scope of the present invention.

Secured transversely to the control arm 22 is an upright plate 54 apertured as at 54A to receive various sized conventional hydraulic and pneumatic elbow fittings 55 associated with the pneumatic and hydraulic lines serving the aforementioned valve controls. Also mounted thereon by an elbow fitting 56 is the hydraulic supply line 53 serving the valve manifold 50. It will be noted in FIGURE 4 that the elbow type fittings are provided to facilitate the orderly routing of the lines as well as to permit the arm to swing through approximately 180 degrees without excessive slack in the hydraulic or pneumatic lines being necessary.

Control arm 22 is swingable independently of the boom indicated generally at 60 by reason of its plane of movement being vertically spaced above the boom when the latter is in the lowered broken line position of FIGURE 1. For temporarily locking the arm in any position throughout its range of movement, a locking mechanism is engageable about the previously mentioned brake plate 31 carried by the lower end of the shaft 24. Such means comprises a flexible metal brake band 61 having a liner 62 of suitable composition material adapted to be closed into gripping engagement about the periphery of plate 31 by an air cylinder 63 having a piston rod 63A.

The cylinder 63 is mounted to the brake band 61 by a reinforced bracket 61A while the rod end thereof terminates in bolted engagement with an opposing bracket at 61B. For controlling cylinder 63, a manually operable valve 64 is conveniently mounted adjacent the outer end of control arm 22, preferably of the three-position type to permit piston rod 63A to be extended to permit free rotation of plate 31 and hence control arm 22 or retracted to lock the same in place. A medial position for the rod 63A is also provided by unpressurizing the cylinder 63 thus permitting a drag to be applied against rotation of the plate 31 as follows. A pair of expansion springs 65–66 are each carried by a threaded shaft 67 and are confined by nut elements 67A with the opposing spring ends in biased contact with flanges of the brackets 61A–61B of ring 61. Upon cylinder 63 being depressurized, the springs 65–66 will urge the band inwardly to a drag position, the degree of which is preset by adjustment of the nut elements 67A. The band 61 is prevented from rotational movement at all times by an upright lug 69 extending medially of a pair of ears 70 affixed to the band. The lug 69 additionally serves to support the locking mechanism in cooperation with an elongated U-bolt, 68.

Boom mounting means include a pair of vertically spaced plates 71–72 extending rearwardly from within the housing 15 to receive a bracket 73 attached thereto by a pair of aligned pins 74–75. Horizontal movement of the bracket about the vertical axes of pins 74–75 is achieved by a pair of hydraulic cylinders 76 (FIGURE 3) having piston rods as at 76A, the cylinders being swingably mounted at their inner ends within the housing 15. The bracket 73 includes a horizontal, transversely extending pivot pin 77 which pivotally mounts the lower end of the boom 60. For positioning the boom within a vertical plane, a hydraulic cylinder 78 is conventionally disposed with its cylinder end swingably mounted to the bracket at 72 and the rod end of the cylinder being boom-mounted at 79. Alternate extension and retraction of the piston rods 76A of the pair of cylinders 76 through the previously described hydraulic valve controls serves to swing the boom through a horizontal plane within an arc of approximately 180 degrees. Additionally, the boom 60 is operationally positionable within a vertical plane with the boom being positionable in the broken line position of FIGURE 1 to permit passage thereover of the control arm 22 upon setting up of the machinery shown for a specific drilling operation.

The outer end of boom 60 is shown supporting a drill assembly indicated generally at 80 mounted in a manner permitting powered movement of the drill assembly both within a vertical plane as well as a generally horizontal plane, as shown in FIGURE 1, for drilling into rock walls.

A detailed description of the drill assembly 80 is not believed necessary as the same is well known in the art and further as earlier noted, the present invention may be used in conjunction with any number of boom-mounted instrumentalities.

Supporting the drill assembly 80 is a bracket horizontally journalled at 83 which is positionable by a first hydraulic cylinder 81 and which carries a second hydraulic cylinder 84, the latter being in crosswise relationship to cylinder 81 for imparting swinging movement to the drill unit 80 about the axis of a normally upright pivot pin indicated at 85 carried by the bracket. The pin 85 pivotally supports a pneumatic cylinder 88 of the drill assembly through suitable mounting means 88A. Indicated at 87 are cylinder mounted pads to which is secured an elongated frame 89 constituting a guideway. Interior of the elongated frame 89 is a slidable member 94 on which is mounted an air hammer 90. Accordingly, by positioning of the outer end of the piston rod of cylinder 88, the slide member with the air hammer 90 mounted thereon may be advanced or retracted along the frame 89 prior to commencement of a drilling operation.

For advancement of the air hammer 84 incident to a drilling operation an air motor 91 is provided coupled via sprocket and chain means with the slidable member for gradually advancing the air hammer 90, a drill rod 92 and bit B driven thereby. A slide bearing 93 supports the drill rod 92 and permits axial movement of the rod during a drilling operation wherein the hammer is advanced by controlled operation of the air motor 91 as aforesaid.

Selective operation of the pneumatic control valves 46 carried by the control arm 22 provides a source of air pressure to the pneumatic components of the drill assembly 80 and similarly the hydraulic valve controls 51 serve the boom positioning cylinders 76 and 78 and the frame positioning cylinders 81 and 84. Accordingly, full control of the boom and drill assembly are provided an operator stationed adjacent the outer end of the control arm 22 which by reason of the length thereof permits removal of the operator from a hazardous area as aforesaid. To operatively dispose control arm 22, the boom 60 will be lowered to permit swinging movement of the arm to a position to one side of the centerline of the machine and oppositely from the drill assembly. Accordingly, the falling particles of rock and loosened earthen material resulting from drilling are avoided by the operator. Repositioning of the boom 60, drill assembly 80 for a subsequent drilling operation is readily accomplished with the control arm 22 first being positioned to enable the operator to be stationed away from the hazardous area of the new drilling site.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

1. In a vehicular machine having a chassis and a horizontally and vertically positionable boom member swingably carried at one end of said chassis, the improvement comprising:

an elongate arm mounting valve controls adjacent one of its ends for manipulation by an operator, said controls being in circuit with boom supported pressure responsive components, pivot means mounting the opposite end of said arm to said one end of the chassis adjacent the boom mounting point on the chassis centerline and permitting horizontal swinging movement of said arm to either side of the centerline through an arc of at least 180 degrees independently of said boom whereby said valve controls on said arm may be located away from the boom member for operator safety, and an arm locking mechanism engageable with said pivot means for retaining the pivot means and hence the arm in a selected position.

2. The invention as claimed in claim 1 wherein said elongated arm constitutes a pressure chamber in communication with a source of pressure and at least some of said valve control means being in communication with said chamber.

3. The invention as claimed in claim 1 wherein said pivot means embodies an upright axis about which the arm may be swingably positioned and said arm having a rotatable pressure tight air coupling mounted on said arm oppositely from said pivot means but in axial alignment therewith.

4. The invention as claimed in claim 1 wherein said arm locking mechanism is adapted to fully engage said pivot means locking same and the arm and further adapted to partially engage said pivot means to exert a drag thereon to inhibit swinging movement of the arm.

5. The invention as claimed in claim 1 wherein said arm locking mechanism comprises a brake band circumferentially disposed about a circular plate and a double acting air cylinder associated with said band for urging same into and out of frictional engagement with said plate.

6. The invention as claimed in claim 5 wherein said brake band is provided with resilient means for urging said band into partial braking engagement with said plate in the absence of pressure within said cylinder to effect a drag on said circular plate.

References Cited

UNITED STATES PATENTS

| | | | |
|---|---|---|---|
| 2,903,949 | 9/1959 | Simmonds | 173—28 X |
| 3,076,559 | 2/1963 | Crile | 212—350 X |
| 3,214,040 | 10/1965 | Willinger | 214—138 |
| 3,244,301 | 4/1966 | Vaughan | 214—138 |

ERNEST R. PURSER, *Primary Examiner.*

U.S. Cl. X.R.

173—22